(12) United States Patent
Matsuzaki

(10) Patent No.: US 6,250,710 B1
(45) Date of Patent: Jun. 26, 2001

(54) FRONT BODY STRUCTURE OF VEHICLE

(75) Inventor: Teruo Matsuzaki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/408,173

(22) Filed: Sep. 29, 1999

(30) Foreign Application Priority Data

Sep. 30, 1998 (JP) .................................. 10-294465

(51) Int. Cl.$^7$ .................................................. B60R 27/00
(52) U.S. Cl. ........................................ 296/188; 296/194
(58) Field of Search ................................. 296/187, 188, 296/29, 30, 192, 193, 194, 203.02

(56) References Cited

U.S. PATENT DOCUMENTS

| | | | |
|---|---|---|---|
| 4,078,840 | 3/1978 | Itoh | 296/28 |
| 4,270,793 | 6/1981 | Harasaki | 296/192 |
| 4,545,612 | * 10/1985 | Harasaki | 296/192 X |
| 4,669,777 | * 6/1987 | Harasaki et al. | 296/194 |
| 4,699,419 | * 10/1987 | Kawase et al. | 296/192 |
| 4,723,811 | * 2/1988 | Harasaki | 296/192 X |

FOREIGN PATENT DOCUMENTS

| | | | |
|---|---|---|---|
| 60-60764 | * 1/1987 | (JP) | 296/194 |
| 4-349077 | 12/1992 | (JP) . | |

OTHER PUBLICATIONS

Abstract of Japan vol. 1998, No. 5, (Apr. 30, 1998) JP 10 001069, (Jan. 6, 1998).

* cited by examiner

*Primary Examiner*—D. Glenn Dayoan
*Assistant Examiner*—Lori L. Coletta
(74) *Attorney, Agent, or Firm*—Smith, Gambrell & Russell, LLP

(57) ABSTRACT

A front body structure of a vehicle having a front pillar, a front bulkhead and a front wheel apron comprises a first reinforcement member on which a reinforcement structure such as beads is provided and welded to the front pillar, the front bulkhead and the front wheel apron. Further, the front body structure comprises a second reinforcement member having a closed cross section, covering at least part of the first reinforcement member and welded to the first reinforcement member.

5 Claims, 5 Drawing Sheets

FRONT BODY STRUCTURE OF VEHICLE

BACKGROUND OF THE INVENTION

The present invention relates to a front body structure of a vehicle and, more specifically to, a reinforcement structure of a front body.

Various front body structures have been proposed in order to enhance a shock absorbing performance of vehicles in an event of collision. For example, Japanese Patent Application Laid-open No. Toku-Kai-Hei 4-349077, as shown in FIG. 6, discloses a technique in which a Y-shaped reinforcement member 500 is disposed respectively at both sides of a cowl 100 which constitutes a lower part of a front windshield of a vehicle.

The reinforcement member 500 has a box-like cross section, or closed cross section, which comprises a base member 600 extending in a transverse direction of the vehicle and a pair of pronged portions 700, 800 bifurcated at both ends 600a of the base member 600. The rear ends 700a, 800a of the pronged portions 700, 800 are connected to an upper portion 1000a and lower portion 1000b of a lower front pillar 1000 which constitutes a lower part of a front pillar 200, respectively. Further, a flange portion 900 of the reinforcement member 500 is spot-welded to a wheel apron 110.

This prior art in which the reinforcement member is secured to the wheel apron is capable of reducing loads exerted on the front pillar or the cowl, compared to a case where no reinforcement member is used, when an excessive load is applied to the front portion of the vehicle. Therefore, it is desired to use the reinforcement member in more effective way, for example, in such a manner that an impact load applied to the front pillar can be reduced.

SUMMARY OF THE INVENTION

It is an object of the present invention to provide a front body structure capable of reducing the deformation of a front pillar and the like effectively.

A front body structure of a vehicle having a front pillar, a front bulkhead and a front wheel apron comprises a first reinforcement member on which a reinforcement structure such as beads is provided and welded to the front pillar, the front bulkhead and the front wheel apron. Further, the front body structure comprises a second reinforcement member having a closed cross section, covering at least part of the first reinforcement member and welded to the first reinforcement member.

DESCRIPTION OF PREFERRED EMBODIMENTS

Figure 2:
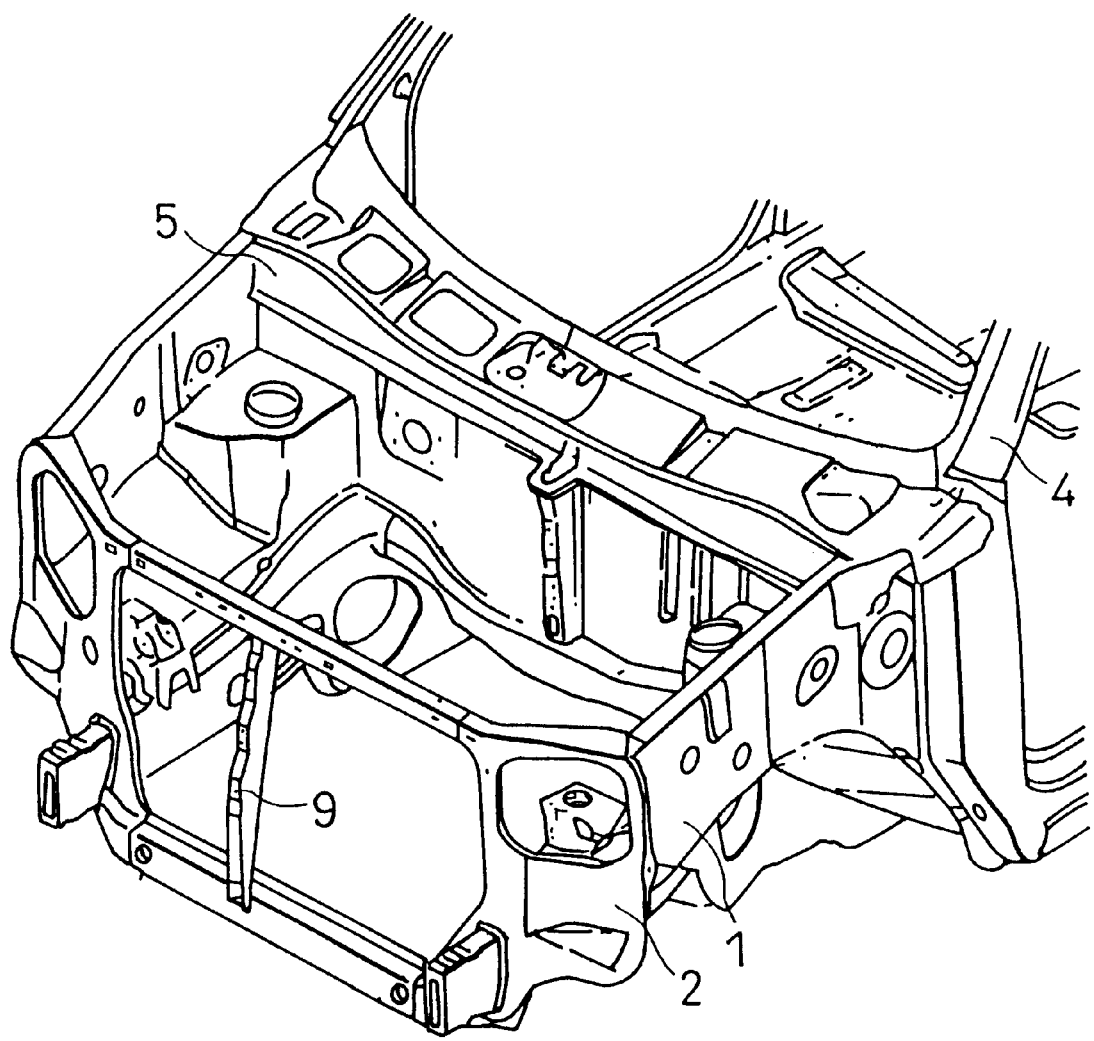
FIG. 2 is a perspective view showing a front body structure of a vehicle.
Figure 3:
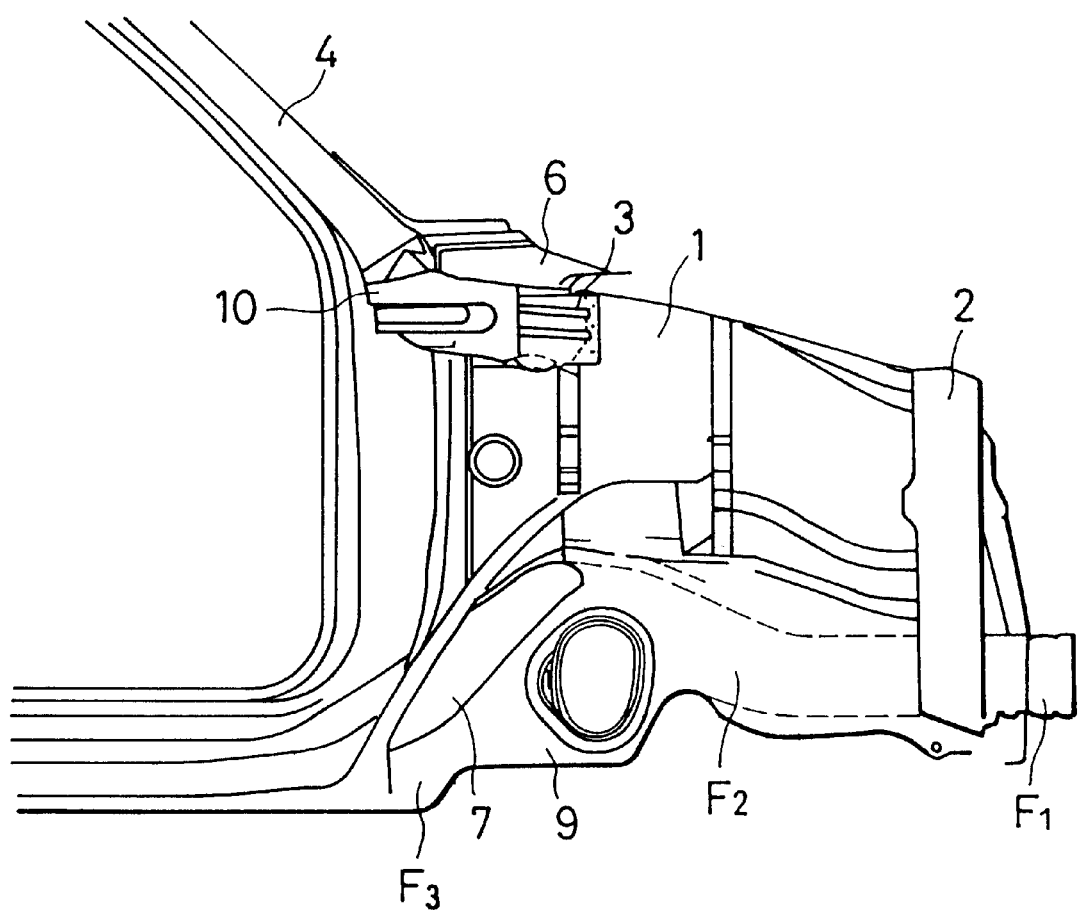
FIG. 3 is a side view showing a front body structure of a vehicle.
Figure 4:
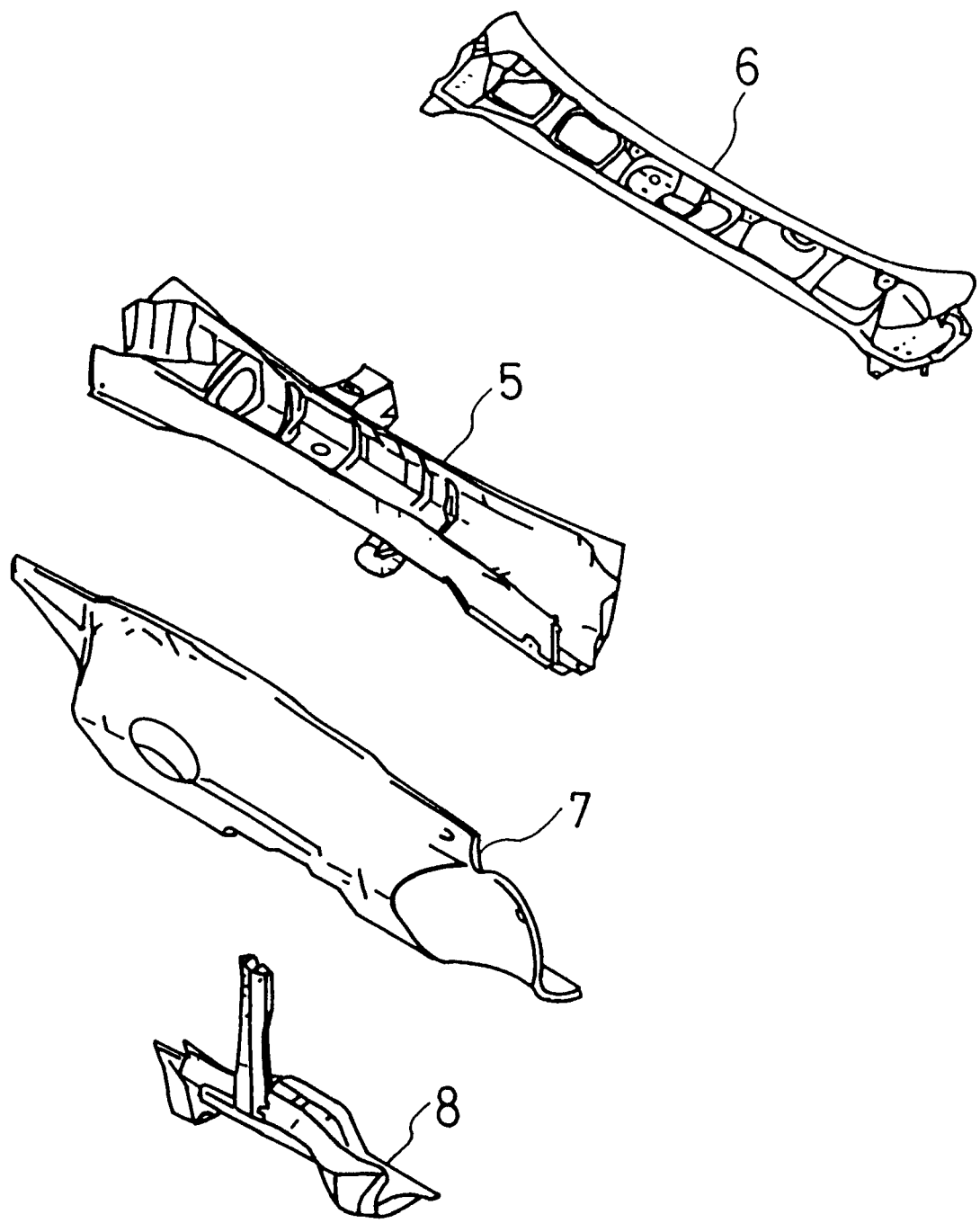
FIG. 4 is a view for explaining a body structure of a vehicle.

Referring now to FIGS. 2 and 3, numeral 1 denotes a front wheel apron secured to a front frame 9. The front wheel apron 1 is secured also to a radiator panel 2 and a reinforcement plate 3. Further, the reinforcement plate 3 is secured to a front bulkhead 5, a front panel 6 and a front pillar 4. As shown in FIG. 4, the front bulkhead 5 is connected by welding integrally with the front panel 6, a toe board 7 and a toe board cross member 8 and is disposed under a front windshield 12. Numeral 10 denotes a reinforcement member secured to the reinforcement plate 3 and the front pillar 4.

Figure 1:
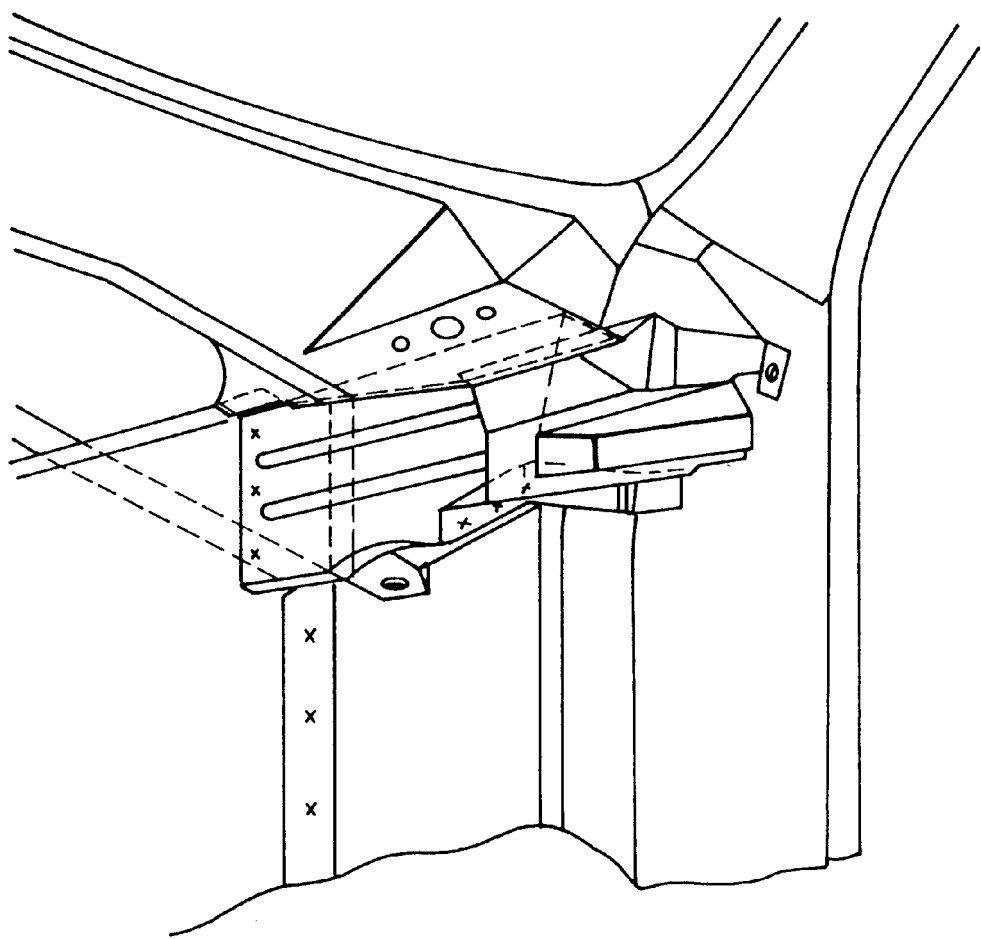
FIG. 1 is a perspective view of a reinforcement member mounted on a vehicle according to an embodiment of the present invention.
Figure 5:
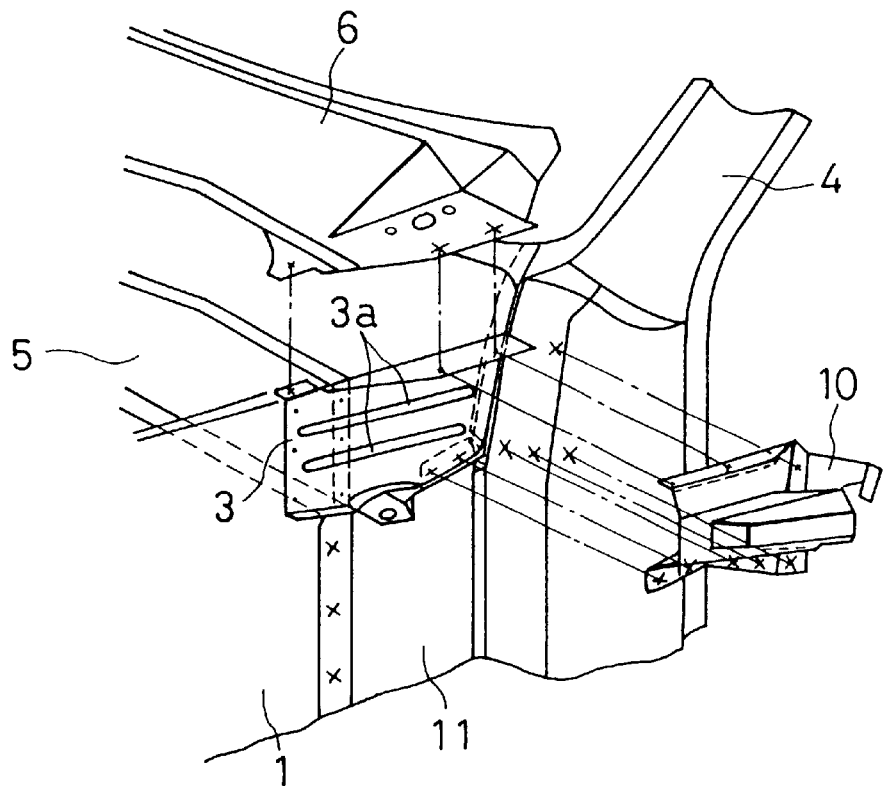
FIG. 5 is a perspective view of a reinforcement plate before being mounted on a vehicle.
Figure 6:
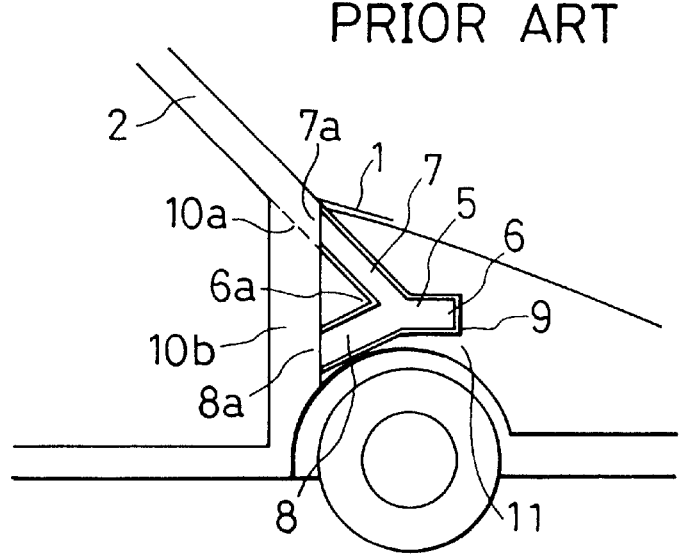
FIG. 6 is a side view showing a conventional front body structure of a vehicle.

FIG. 5 shows a state before the reinforcement plate 3 is attached to the front panel 6 and the reinforcement member 10 is attached to the reinforcement plate 3. Further, FIG. 1 shows a state after the reinforcement plate 3 is attached to the front panel 6 and the reinforcement member 10 is attached to the reinforcement plate 3. The reinforcement plate 3 is reinforced by two beads 3a, 3a and spot-welded to the wheel apron 1 and bulkhead 5. Also, the reinforcement plate 3 is spot-welded at an upper flange thereof to the front panel 6. Further, the reinforcement plate 3 is spot-welded at lower and right flanges thereof to an inner front pillar 11 and the front pillar 4, respectively.

On the other hand, the reinforcement member 10 has a substantially U-shaped cross section, forming a closed cross section when it is secured to other members, the reinforcement plate 3 and the front pillar 4. The reinforcement member 10 is provided with a flange section at an edge thereof for connecting therethrough with other members. Furthermore, the reinforcement member (10) has a second cross section 10a projected over the substantially U-shaped cross section so as to increase strength. In FIG. 4, portions marked x show ones where spot-welding is to be applied. The reinforcement member 10 is spot-welded at a lower flange thereof to the reinforcement plate 3 and the front pillar 4 in such a manner that it covers the rear part of the reinforcement plate 3 from the side. Further, it is spot-welded at an upper flange thereof to the reinforcement plate 3 and the front pillar 4. Thus, the reinforcement member 10 is secured to the front pillar 4 in such a manner as projecting from the front pillar 4, namely, the lower part of the windshield in the forward direction.

When an impact load is applied from front, first a front end $F_1$ of the front frame 9 is collapsed and then an intermediate portion $F_2$ of the front frame 9 is deformed. At this stage, the impact load is absorbed to some extent. Further, the load is absorbed at a rear end F3 of the front frame 9 and is transmitted to the rear part of the vehicle body. On the other hand, a part of the load is also transmitted to the front pillar 4 through the toe board 7. The load inputted from the toe board 7 is transmitted to the upper part of the front pillar 4 through a connecting structure constituted by the reinforcement plate 3 and the reinforcement member 10. In case where there is no such connecting structure, the load inputted from the toe board 7 concentrates to a lower part of the front pillar 4. As a result, the lower part of the center pillar 4 is largely deformed by the loads transmitted from the front frame 9 and the toe board 7. Since the connecting structure 13 according to this embodiment has such an effect as transmitting the load inputted from the toe board 7 to the upper part of the front pillar 4, the deformation of the front pillar 4 can be alleviated. Further, since this connecting structure 13 enables to suppress the deformation of a door hinge, there is a lessened fear that a door is hard to open in an emergency. Further, since the reinforcement structure is constituted by members having a relatively simple structure, an effective front body structure can be obtained with cheap manufacturing cost.

Further, since the connecting structure 13 composed of the reinforcement plate 3 and the reinforcement member 10 is located slightly ahead of the front end of the windshield, 12 the reinforcement member 10 absorbing a most part of impact load prevents the windshield 12 from being largely damaged. As a result, for example, such possibility that the glass of the windshield 12 is broken into very small pieces and these small pieces of glass are scattered around, can be reduced.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A front body structure of a vehicle having, a front wheel apron, a front panel, a front pillar, a front bulkhead and a front windshield comprising:
    a first reinforcement member secured to said front pillar and said front bulkhead and reinforced by a bead formed thereon; and
    a second reinforcement member secured to said first reinforcement member and said front pillar and covering at least part of said first reinforcement member.

2. A front body structure of a vehicle having, a front wheel apron, a front panel, a front pillar, a front bulkhead and a front windshield comprising:
    a first reinforcement member secured to said front pillar and said front bulkhead; and
    a second reinforcement member secured to said first reinforcement member and said front pillar, and having a reinforcement structure formed by a substantially U-shaped cross section thereon and covering at least a part of said first reinforcement member.

3. A front body structure of a vehicle having, a front frame, a wheel apron secured to said front frame, a front panel positioned at front of a windshield, a toe board connected with said front frame, a bulk head connected with said front panel and said toe board integrally, and a front pillar including an inner front pillar, comprising:
    connecting structure secured to said bulkhead, said front panel, said wheel apron, said inner front pillar and said front pillar for transmitting a impact load from said front frame and said toe board to the upper part of said front pillar so as to prevent said front pillar from deforming,
    said connecting structure includes:
        a first reinforcement member formed by a plate member and secured to said front bulkhead, said front panel and said inner front pillar, said front pillar and said wheel apron, said first reinforcement member is reinforced by a bead, and
        a second reinforcement member secured to said first reinforcement member and said front pillar for forming a closed section at a rear part of said first reinforcement member.

4. A front body structure of a vehicle having, a front frame, a wheel apron secured to said front frame, a front panel positioned at front of a windshield, a toe board connected with said front frame, a bulk head connected with said front panel and said toe board integrally, and a front pillar including an inner front pillar, comprising:
    connecting structure secured to said bulkhead, said front panel, said wheel apron, said inner front pillar and said front pillar for transmitting a impact load from said front frame and said toe board to the upper part of said front pillar so as to prevent said front pillar from deforming,
    said connecting structure includes:
        a first reinforcement member formed by a plate member and secured to said front bulkhead, said front panel and said inner front pillar, said front pillar and said wheel apron, and
    a second reinforcement member secured to said first reinforcement member and said front pillar for forming a closed section at a rear part of said first reinforcement member, said second reinforcement member forms a first closed section with said first reinforcement member and said front pillar, and a second closed section projected over said first closed section.

5. The front body structure according to claim 4, wherein said second reinforcement member is located slightly ahead of a front end of said windshield for absorbing the a most part of impact load to prevent said windshield from being damaged by said first and second closed section.

* * * * *